United States Patent
Barja et al.

(10) Patent No.: US 10,769,167 B1
(45) Date of Patent: Sep. 8, 2020

(54) FEDERATED COMPUTATIONAL ANALYSIS OVER DISTRIBUTED DATA

(71) Applicant: LIFEBIT BIOTECH LIMITED, London (GB)

(72) Inventors: Pablo Prieto Barja, London (GB); Maria Chatzou, London (GB); Matija Sosic, London (GB); Martin Sosic, London (GB); Diogo Nuno Proenca Silva, London (GB); Bruno Filipe Ribeiro Goncalves, London (GB); Tiago Filipe Salgueiro De Jesus, London (GB); Olga Kruglova, London (GB); Damyan Dobrev, London (GB)

(73) Assignee: LIFEBIT BIOTECH LIMITED (GB)

( * ) Notice: Subject to any disclaimer, the term of this patent is extended or adjusted under 35 U.S.C. 154(b) by 0 days.

(21) Appl. No.: 16/777,637

(22) Filed: Jan. 30, 2020

(30) Foreign Application Priority Data

Dec. 20, 2019 (GR) .............................. 20190100568

(51) Int. Cl.
| | |
|---|---|
| *G06F 16/25* | (2019.01) |
| *G06F 16/28* | (2019.01) |
| *G06F 16/14* | (2019.01) |
| *G06F 16/16* | (2019.01) |
| *G06F 16/22* | (2019.01) |
| *G06F 16/2458* | (2019.01) |
| *H04L 9/08* | (2006.01) |
| *G06N 20/00* | (2019.01) |
| *G06F 21/62* | (2013.01) |

(52) U.S. Cl.
CPC .......... *G06F 16/256* (2019.01); *G06F 16/285* (2019.01); *G06F 21/6218* (2013.01); *G06N 20/00* (2019.01); *H04L 9/0891* (2013.01); *G06F 16/148* (2019.01); *G06F 16/164* (2019.01); *G06F 16/2255* (2019.01); *G06F 16/2471* (2019.01)

(58) Field of Classification Search
CPC ..... G06Q 10/06; G06F 16/148; G06F 16/164; G06F 16/2255; G06F 16/2471; G06F 16/256
USPC .......................... 707/608, 713, 722, 769, 781
See application file for complete search history.

(56) References Cited

U.S. PATENT DOCUMENTS

| | | | |
|---|---|---|---|
| 2012/0060165 A1* | 3/2012 | Clarke .................. | G06F 9/5038 718/104 |
| 2013/0018694 A1* | 1/2013 | Dubbels ................. | G06Q 10/00 705/7.27 |

(Continued)

*Primary Examiner* — Dangelino N Gortayo
(74) *Attorney, Agent, or Firm* — Dorsey & Whitney LLP

(57) ABSTRACT

The present disclosure provides for computational data analysis across multiple data sources. A pipeline (or workflow) is imported and a dataset is selected. The dataset resides on a virtual file system and includes data residing on one or more storage locations associated with the virtual file system. One or more compute resources are selected to perform the pipeline analysis based at least on the imported pipeline and the dataset. The one or more compute resources are selected from a plurality of available compute resources associated with the one or more storage locations associated with the virtual file system. The pipeline analysis is performed using the selected compute resources on the dataset in one or more secure clusters. The resulting data generated from the pipeline analysis is submitted to the virtual file system.

20 Claims, 8 Drawing Sheets

(56) References Cited

U.S. PATENT DOCUMENTS

| | | | | |
|---|---|---|---|---|
| 2014/0325587 A1* | 10/2014 | Nilsson | ............... | G16B 50/00 726/1 |
| 2016/0055221 A1* | 2/2016 | Paquette | ............... | G06F 16/287 707/722 |
| 2016/0103659 A1* | 4/2016 | Tijanic | ............... | G06F 8/34 717/115 |
| 2016/0253321 A1* | 9/2016 | Lee | ............... | G06F 16/164 707/769 |
| 2019/0147092 A1* | 5/2019 | Pal | ............... | H04L 67/10 707/713 |

* cited by examiner

FEDERATED COMPUTATIONAL ANALYSIS OVER DISTRIBUTED DATA

BACKGROUND

Analyzing large data sets, such as biological data may use extensive computing resources and may involve large amounts of sensitive data. For example, gene sequences (e.g., genomics data coming from next generation sequencing (NGS) machines) are highly complex and large data sets including sensitive personal data. Given the breadth of data sets, many entities may store their data on various different computing resources, such as local servers, cloud repositories, and the like. Currently, large datasets often require copying the data and sending the data to the machine or machines that will be performing the computational analysis. This approach uses unnecessary computing resources to copy, transfer, and download data and makes sensitive data more prone to a security or regulatory breach, as well as incurring additional costs associating with downloading data (e.g., cloud egress charges). Additionally, many of the computer resources, such as a local database and a cloud repository have to be accessed separately from one another, preventing streamlined analysis across multiple data sources and/or databases.

It is therefore desirable to provide a system for performing computational data analysis over data sets that are distributed across different storage locations. Input data for analysis resides on a secure remote storage location. Analysis servers select computational machines to perform analysis on the input data using a pipeline and to create a secure cluster on the secure remote storage location. The selected computational machines perform the analysis on the input data using the pipeline by streaming the input data to the secure cluster during analysis.

SUMMARY

The present disclosure provides for computational data analysis across multiple data sources. A pipeline (or workflow) is imported and a dataset is selected. The dataset resides on a virtual file system and includes data residing on one or more storage locations associated with the virtual file system. One or more compute resources are selected to perform the pipeline analysis based at least on the imported pipeline and the dataset. The one or more compute resources are selected from a plurality of available compute resources associated with the one or more storage locations associated with the virtual file system. The pipeline analysis is performed using the selected compute resources on the dataset in one or more secure clusters. The resulting data generated from the pipeline analysis is submitted to the virtual file system.

In some implementations, performing the pipeline analysis includes streaming the dataset to the one or more secure clusters from one of the one or more storage locations. The virtual file system may include one or more files, where the one or more files point to the data residing on the one or more storage locations.

A selection of a storage location of the one or more storage locations may be received, along with a location within the virtual file system. The resulting data generated from the pipeline analysis is then submitted to the virtual file system in accordance with the selected storage location and the selected location within the virtual file system. The one or more storage locations may be cloud storage locations. The one or more storage locations may also include cloud storage locations and localized user storage.

The pipeline analysis may be performed on the one or more selected compute resources where at least one of the one or more selected compute resources is part of a first secure cluster of the one or more secure clusters and at least a second of the one or more selected compute resources is part of a second secure cluster of the one or more secure cluster. The first secure cluster may be correlated with a first storage location associated with the virtual file system and the second secure cluster may be correlated with a second storage location associated with the virtual file system.

The present disclosure provides a system for performing computational data analysis. One or more storage locations include input data. An analysis operating system is configured to select one or more compute resources to perform analysis on the input data using a pipeline and to create one or more secure clusters including the one or more compute resources. The one or more compute resources are configured to perform the analysis of the input data using the pipeline. The one or more secure clusters are not accessible after creation.

The input data may be located on two or more storage locations and may be represented by a dataset located on a virtual file system. The one or more storage locations may be localized user storage locations associated with localized user compute resources. The analysis operating system may further create a secure cluster including one or more of the localized compute resources.

The one or more analysis servers may store results from the analysis of the input data using the pipeline to a location on the virtual file system.

The present disclosure provides for computational data analysis by importing a pipeline, selecting one or more compute resources to perform a pipeline analysis based on the imported pipeline and user input. The one or more compute resources are associated with one or more of a plurality of storage locations communicatively connected using a virtual file system. The pipeline analysis is performed using the one or more selected compute resources. The one or more compute resources perform the pipeline analysis. The one or more compute resources are located within one or more secure clusters on the one or more storage locations. The resulting data generated from the pipeline analysis is submitted to one or more selected storage locations of the plurality of storage.

The one or more compute resources may be selected based on an estimated run time of the pipeline analysis. Machine learning may be used to improve the estimated run time over time. Further, the one or more compute resources may be selected based on an estimated cost of the pipeline analysis. The estimated cost may be based on historical pricing data for the one or more compute resources.

A secure cluster may be created on a cloud compute resource, where the secure cluster includes a monitor configured to return run time data during the analysis. One or more keys to the secure cluster may be destroyed prior to the analysis.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that.

DETAILED DESCRIPTION

According to the present disclosure, a computational analysis system is provided. The computational analysis system may orchestrate computing resources to perform data analysis over data distributed across multiple storage locations. The computational analysis system may also use a virtual file system to allow a user to create datasets for analysis including data distributed across multiple storage locations. The data analysis may be performed within one or more secure clusters to improve the security of sensitive data, such as DNA or other biological data.

Figure 1:
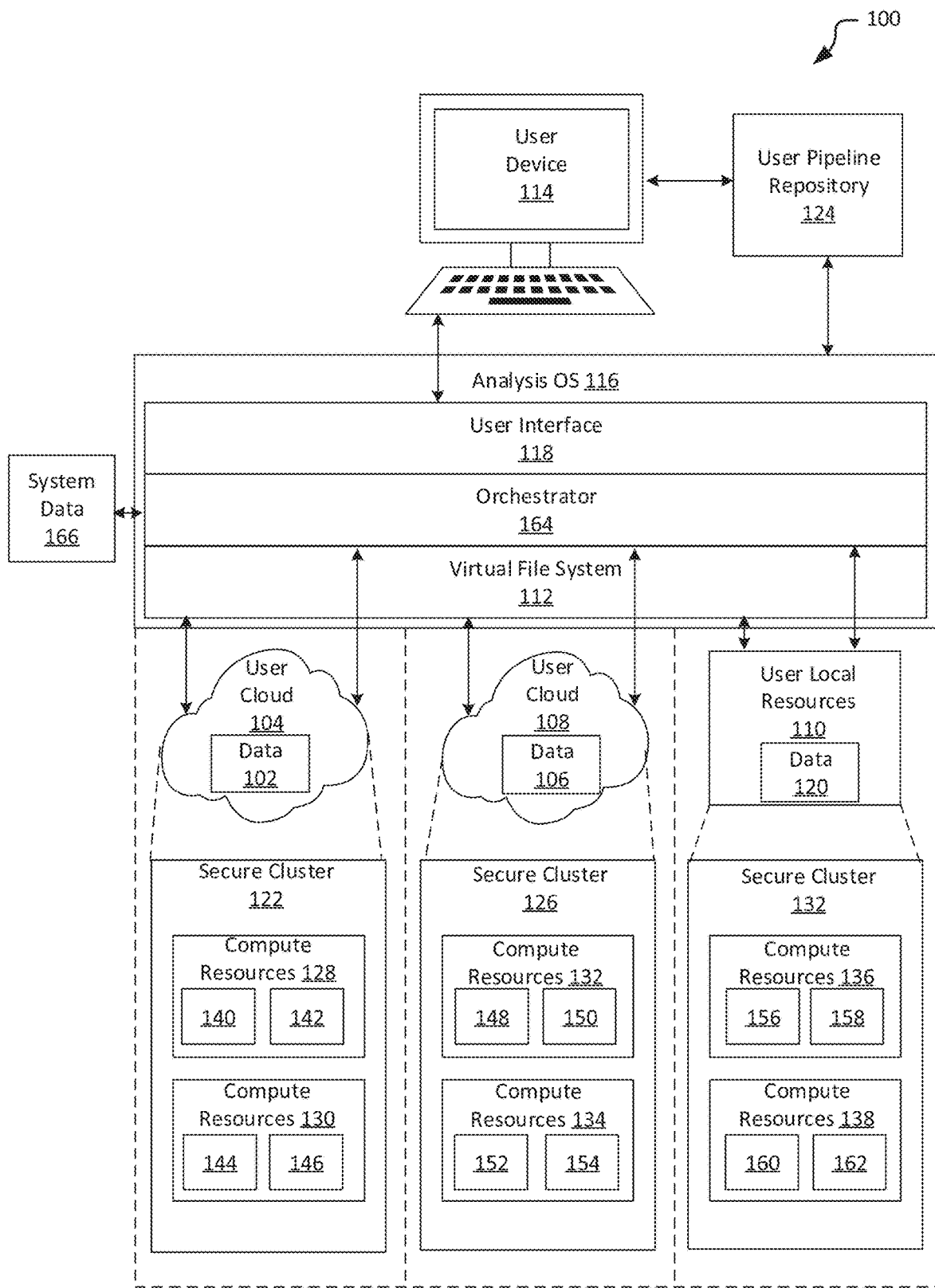
FIG. 1 is a schematic diagram of an example computational analysis system.

FIG. 1 is a schematic diagram of an example computational analysis system including an analysis operating system (OS) and user storage locations. Input data 102 is stored on user remote storage 104, input data 106 is stored on user remote storage 108, and input data 120 is stored on user local resources 110. The user remote storage 104 and the user remote storage 108 may be, for example, storage on user cloud accounts on two different cloud providers. The user local resources 110 may include user servers, virtual machines, or storage repositories. The computational analysis system may group the user remote storage 104 and the user remote storage 108, along with other locations where user data may be stored (such as localized user storage 110), into a virtual file system 112. The virtual file system 112 creates a common interface for a user to access, group, organize, and analyze data.

A user device 114 may access the input data 102 stored on the user remote storage 104, the input data 106 stored on the user remote storage 104, and the input data 120 stored on the user local resources 110 using the virtual file system 112 presented to the user device 114 via a user interface 118 of the analysis OS 116. The orchestrator 164 of the analysis OS 116 coordinates the data analysis of the input data 102 on the user remote storage 104, the input data 106 located on the user remote storage 108, and the input data 120 on the user local resources 110 by configuring and deploying secure clusters 122, 126, and 132.

The input data 102 may be streamed to the secure cluster 122 as needed for analysis. Similarly the input data 106 may be streamed to the secure cluster 126 and the input data 120 may be steamed to the secure cluster 132. The secure cluster 122 is deployed, in this example, in the user remote storage 104 such that the input data 102 does not leave the user remote storage 104 for analysis. Similarly, the secure cluster 126 is deployed within the user remote storage 108 and the secure cluster 132 is deployed within the user local resources 110. Input data is accordingly not copied and downloaded to a separate environment for analysis. As a result, the input data 102, the input data 106, and the may remain in the user's control. In some implementations, one or more user storage locations may not be associated with compute resources. Input data from a user storage location without compute resources may be streamed to another secure cluster deployed within the virtual file system 112 by the orchestrator 164, such that the input data remains in a user storage location in the control of the user. The orchestrator 164 may stream data to another secure cluster within the virtual file system 112 when it is indicated by the analysis (e.g., when input data on two separate user storage locations are part of a combined computation.

Further, the analysis OS 116 may allow a user to select one or more compute resources to include in the secure clusters to maximize or minimize variables involved in data analysis. For example, the user may select a combination of compute resources that will perform the analysis in the shortest amount of time. Or, the user may select a machine that will perform the analysis for the lowest cost. Compute resources may include both allocated processing (e.g., processing 140, 148, 156, 144, 152, and 160) and allocated memory (e.g., memory 142, 150, 158, 146, 154, and 162). Compute resources may be, for example, instances, virtual machine instances, or compute nodes.

Further, the virtual file system 112 allows a user to view and access the input data 102, the input data 106, and the input data 120 as if it were residing in the same storage location. Consequently, the user may build datasets for analysis that include data located on both the user remote storage 104, the user remote storage 108, and the user local resources 110. The input data 102, the input data 106, and the input data 120 will be streamed or otherwise transferred to the secure clusters 122, 126, and 132, respectively as needed for analysis.

In an exemplary process of data analysis, the data analysis process is initiated from the user device 114. The user device 114 may access the user remote storage 104, the user remote storage 108, the user local resources 110 and the analysis OS 116. The user device 114 requests a new data analysis from the analysis OS 116. The analysis OS 116 may already have access to the user remote storage 104, the user remote storage 108, and the user local resources 110 or may request access to the user storage locations. For example, the user device 114 may grant access to the user remote storage 104 and the user remote storage 108 to the analysis OS 116 through an authorization token or through user keys. Once the analysis OS116 has access to the user remote storage 104, the user remote storage 108, and the user local resources 110, the analysis OS 116 may read data on the user remote storage 104, the user remote storage 108, and user local resources 110 and may write data to the user remote storage 104, the user remote storage 108, and the user local resources 110.

In some implementations, the analysis OS 116 may have access to system data 166, including a system pipeline repository. The analysis OS 116 may also request access, through the user device 114 to a user pipeline repository 124. The system pipeline repository and the user pipeline repository 124 may include frequently used pipelines, or common analytical process flows. To begin analysis, the analysis OS 116 may request a pipeline from the user via the user interface 118. The request may be accompanied by the ability to search the user pipeline repository 124 for existing frequently used pipelines. Additionally, the request may be accompanied by an interface (presented on the user device 114) for the user to create a new pipeline. When the user creates a new pipeline, the user may be presented with the option to store the new pipeline on the pipeline repository 124.

Once the user has chosen a pipeline, the analysis 116 may prompt the user to create a dataset from data accessible to the virtual file system 112. In some implementations, the virtual file system 112 may use and organize data stored on a single user cloud account. In other implementations, such as the implementation shown in FIG. 1, the virtual file system 112 may use and organize data across two or more user storage locations (e.g., user remote storage 104, user remote storage 108, and user local resources 110), such as storage locations on user cloud accounts through different providers. In implementations where the virtual file system 112 uses and organizes data stored in multiple locations, the user may create data sets for analysis that use data stored in multiple locations without having to move the data from one location to another location. The virtual data system may be presented by the analysis OS 116 to the user device 114 via the user interface 118 and may display data across all of the location available to the virtual file system 112 as if the data were in a single location. Additionally, the user may choose a location for resultant data produced by analysis within the virtual file system 112.

The analysis OS 116 may present all data located on locations accessible to the virtual file system 112 to the user through the user interface 118 presented on the user device 114 and prompt the user to create a data set for analysis. For example, in FIG. 1, the data set includes input data 102 stored on user remote storage 104, input data 106 stored on user remote storage 108, and input data 120 stored on user local resources 110.

Once the analysis OS 116 has received the input data 102, the input data 106, the input data 120 and the pipeline, the analysis OS 116 may assist the user in selecting one or more compute resources to use in analyzing the input data 102 and the input data 106. The machines may be serviced by a cloud provider, serviced with the analysis servers 116, or may be localized computing resources 126 of the user. In one implementation, the analysis servers 116 use historical data from available machine to predict analysis time, computing resources, and cost for using the received pipeline to analyze the input data 102 and the input data 106. The historical data may include actual analysis time, use of computing resources, and cost for using various machines or combinations of machines to run a similar pipeline on a similarly sized data set. In one implementation, the analysis servers 116 may generate a graphic to display on the user device 114 indicating the predicted cost, computing resources, or analysis time for available machines or combinations of machines. In some implementations, the analysis servers may use machine learning to make these estimations more accurate over time.

After receiving a selection of machines to use in analyzing the input data 102 and the input data 106, the analysis servers 116 begin facilitating the analysis. The analysis servers 116 create the secure cluster 118 to secure the analysis. In some implementations, the secure cluster 118 may be created within a provisioned area of a user's cloud account. The secure cluster 118 may be encrypted and protected by a key, a firewall, or other barrier to access. The analysis servers 116 use a key 120 to access the secure cluster 118 and upload the pipeline such that the data analysis is performed within the secure cluster. The input data 102 and the input data 106 is streamed into the secure cluster 118 as needed for analysis. As another example, the input data 102 and the input data 106 may be temporarily accessed or copied within the secure cluster 118, but as the secure cluster 118 becomes inaccessible or permanently "locked" after creation, any data copied into the secure cluster 118 is not accessible outside of the cluster. The secure cluster 118 protects against access of the input data 102 and the input data 106 during the analysis and any other intermediate data and data generated by the analysis.

When creating the secure cluster 118, the analysis servers 116 deploy a monitor or other status module within the secure cluster 118. The monitor returns run data 122 to the analysis servers 116 so that the analysis servers 116 may monitor the analysis in real-time. Once the secure cluster 118 is created, the analysis servers 116 destroy the key 120 that provides access to the secure cluster 118. Accordingly, the input data 102 and the input data 106 are not accessible within the secure cluster 118. While the pipeline is running within the secure cluster 118, the analysis servers 116 monitor the run data 122. If the run data 122 indicates a problem, the secure cluster 118 is destroyed. If the run data 122 does not indicate a problem, the secure cluster 118 continues until the analysis is complete. When the analysis is complete, the secure cluster 118 deposits the results of the analysis in the virtual file system 112 as output data 132. The user may determine where to store the output data 132 within the virtual file system 112. Once the output data 132 is stored within the virtual file system 112, the secure cluster 118 is destroyed such that no copy of the input data 102, the input data 106, and data generated as a result of the analysis exists outside of their specified remote storage locations 104 and 108 respectively as a result of the analysis.

Figure 2:
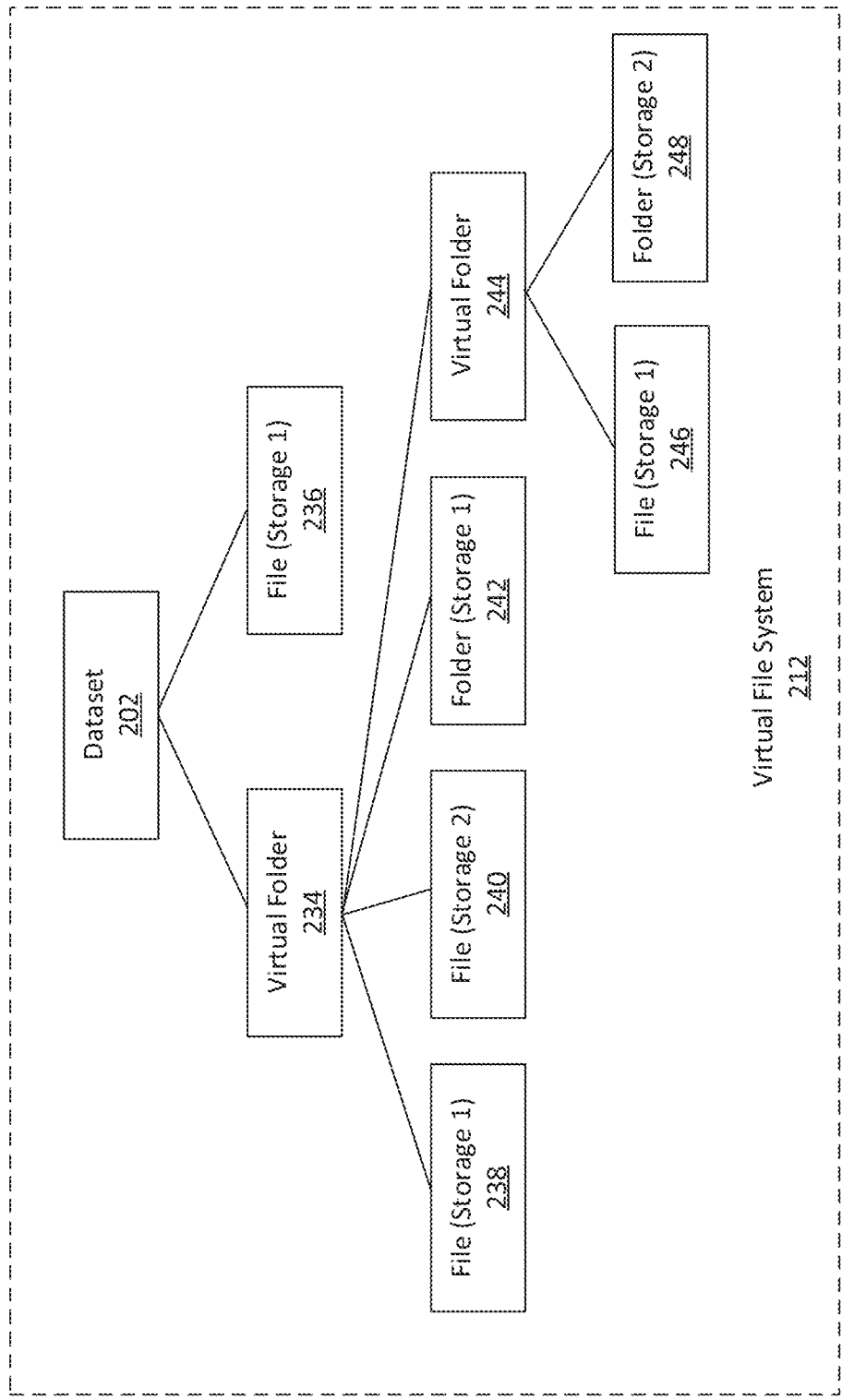
FIG. 2 is a schematic diagram of an example dataset residing on a virtual file system.

FIG. 2 is a schematic diagram of an example dataset residing on a virtual file system 212. The virtual file system 212 can organize data located on multiple user storage locations such as, for example and without limitation, user cloud storage accounts, localized user storage, and other user remote storage. The virtual file system 212 shown in FIG. 2 includes a dataset 202. The dataset 202 includes data from a first user storage location and a second user storage location. The dataset 202 is a top level virtual storage container used within the virtual file system 212 to organize data from multiple user storage locations. Elements within the dataset 202 include, for example, data files (e.g., files 236, 238, 240, and 246), folders (e.g., folders 242 and 248), and virtual folders (e.g., virtual folders 234 and 244).

The virtual file system 212 may be created when the user gives the analysis servers access to the data locations included in the virtual file system 212. For example, in one implementation, the analysis servers generate a user interface for the user to enter access credentials to user cloud accounts to be included in the virtual file system. For example, the analysis servers may run an application programming interface to interface with the user cloud accounts. When localized user storage or other user storage is included in the virtual file system 212, the analysis OS may request, and the user or the user's computing systems may provide, access credentials such as keys, passwords, or other means to access the user storage. Once the analysis OS has access to user storage locations to be included in the virtual file system 212, the user may create datasets within the virtual file system 212 using data stored on the user storage locations. Further, the analysis servers may maintain access to the user storage locations to write data (such as resultant data from the data analysis) to the user storage locations. As the analysis OS accesses the data set, it can replicate the file structure to generate a visual of the data stored within the selected accounts, repositories, databases, and other locations (either locally and/or cloud based).

Like the dataset 202, the virtual folders 234 and 244 are virtual containers within the virtual file system 212 and do not point to actual folders with data in storage. In contrast, folders 242 and 248 point to storage items and may be created by, for example, importing a directory into the virtual file system 212. As shown in FIG. 2, the folder 242 is a directory imported from the first user storage location and the folder 248 is a directory imported from the second user storage location. The virtual folders 234 and 244, however, may be selected as locations for new data, such as data imported into the dataset 202 from different remote storage locations or output data generated as a result of data analysis.

The files 236, 238, 240, and 246 may be created either by uploading files or importing files to the virtual storage system 212. When a file is created by uploading, the file does not already exist on the first user storage location or the second user storage location. When the file is uploaded to the virtual storage system 212, the file is ultimately stored either on the first user storage or the second user storage and the file object in the virtual storage system 212 points to the file's location either on the first user storage or second user storage. In some implementations, the user may choose which user location to use to store the file during uploading. The uploading process may be initiated by the user or may occur as the result of another process, such as the transfer of resultant data from data analysis. When a file object is created by importing an already existing file to the virtual file system 212, the file is already stored on either the first user storage or the second user storage and the file within the virtual file system 212 points to the storage location of the file.

Figure 3:
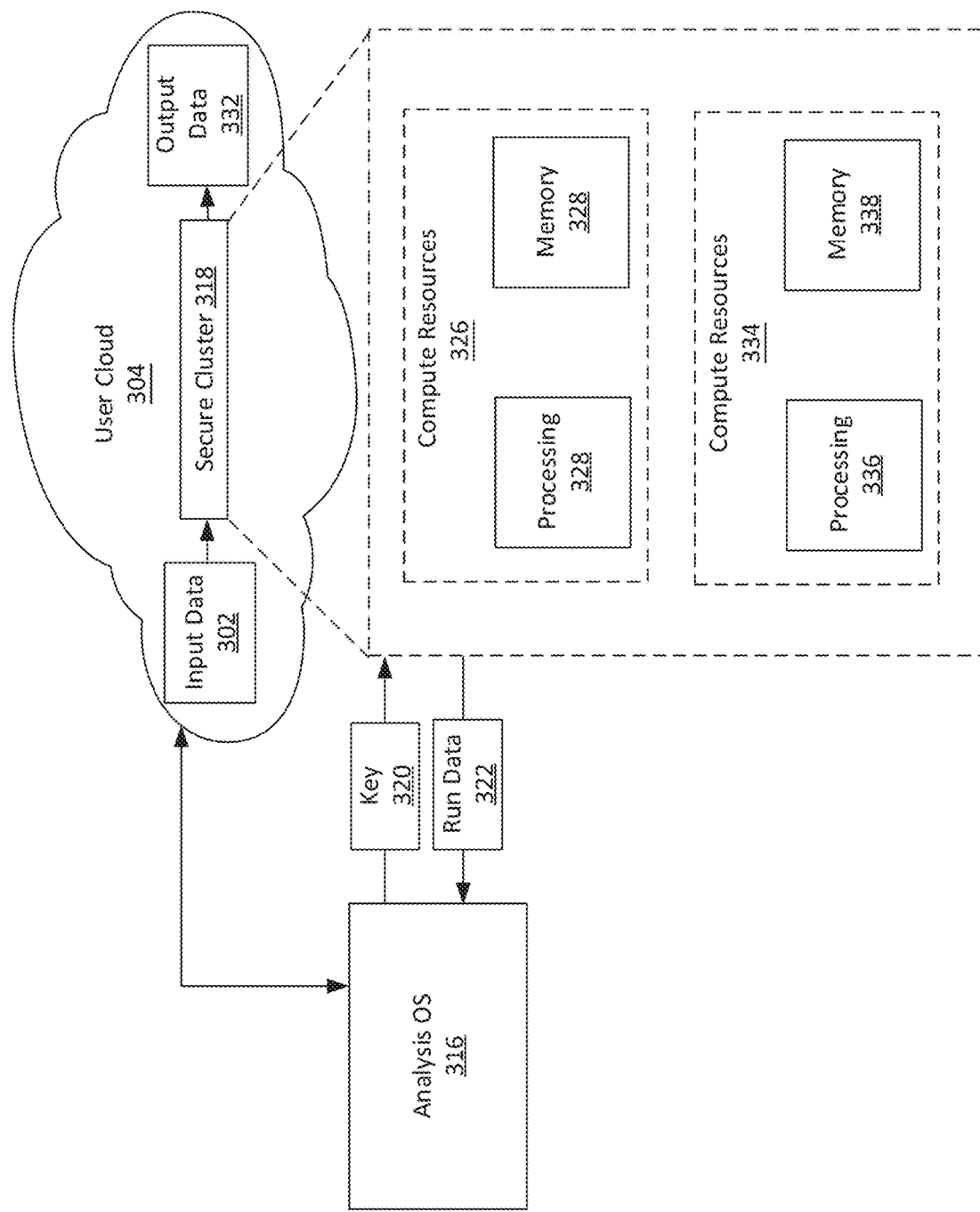
FIG. 3 is a schematic diagram of an example computational analysis system.

FIG. 3 is a schematic diagram of an example computational analysis system. The computational analysis system of FIG. 3 includes an analysis OS 316 that coordinates data analysis for input data 302 located on user remote storage 304. In some implementations, the input data 302 may be data located on a user cloud storage account. In other implementations, additional input data may be located on further user remote storage locations or local user storage locations. A dataset may then be constructed in a virtual file system for data analysis across the multiple user remote storage locations, as previously discussed with respect to FIGS. 1 and 2.

The analysis OS 316 deploys a secure cluster 318 to perform the analysis of the input data 302. Further, the analysis OS316 may deploy the user computing resources 326 and 334 in the secure cluster 318 to perform the analysis of the input data 302.

Analysis within the secure cluster 318 occurs in the same manner as analysis within the secure cluster 118, described above with respect to FIG. 1. The secure cluster 318 includes remote storage compute resources 326 and 334 (e.g., instances) including allocated processing and memory. The analysis OS 316 uses a key 320 to deploy the secure cluster 318. The analysis OS 316 deploys a monitor within the secure cluster 318 and receives run data 322 while the analysis is running. Similarly to the system discussed with respect to FIG. 1, the secure cluster 318 is destroyed once the analysis is complete and the output data 332 has been delivered to the user remote storage 304. Because remote storage compute resources 326 and 334 are a part of the user remote storage 304, the input data 302 remains in the user remote storage 304.

Figure 4:
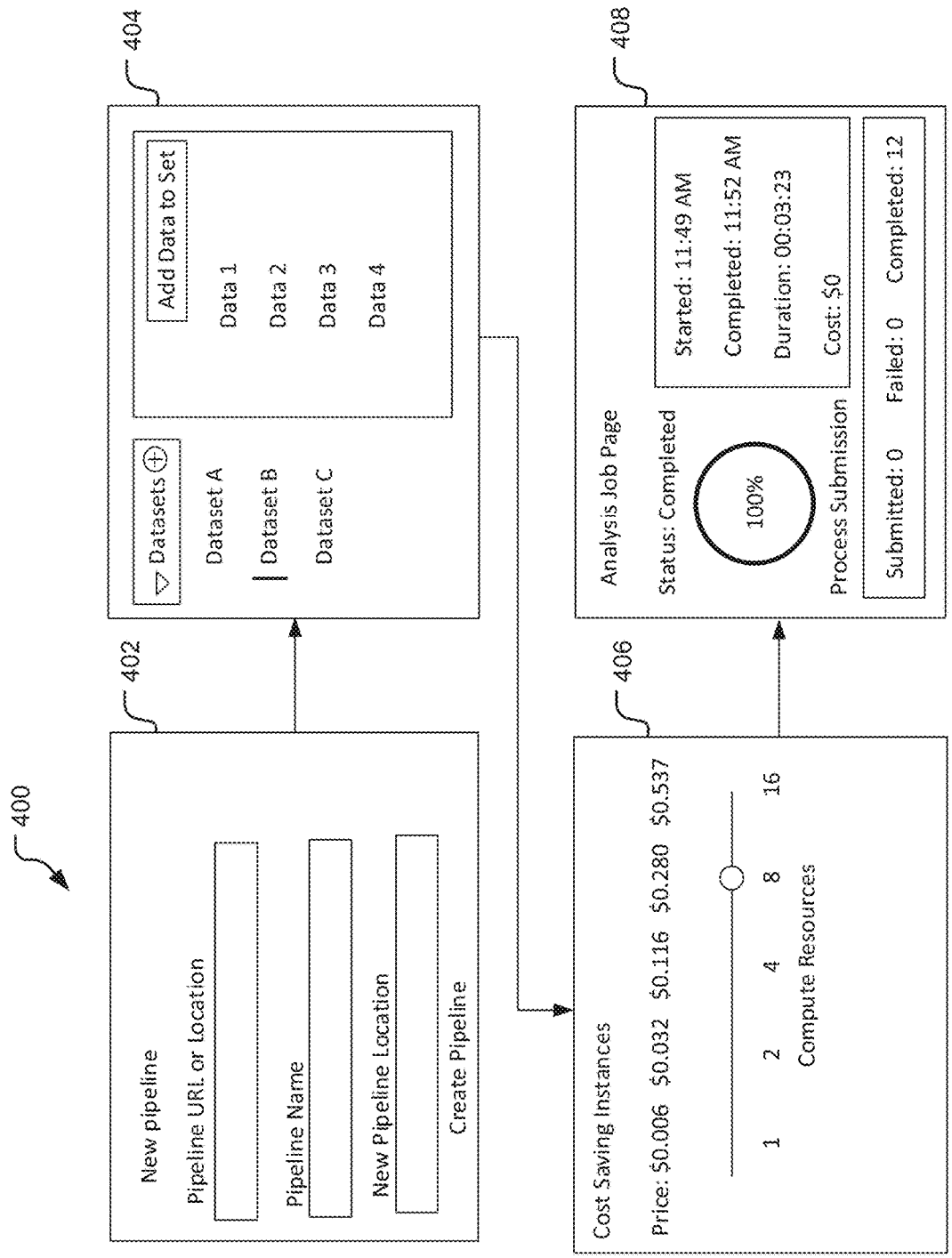
FIG. 4 is an example user interface of a computational analysis system.

FIG. 4 is an example user interface 400 of an analysis OS. The example user interface may be displayed, for example on a user device (e.g., user device 106 in FIG. 1).

A first user interface 402 allows the user to select a pipeline for the analysis. As shown, the first user interface 402 allows the user to import and name a new pipeline. The new pipeline may be imported from several locations including, without limitation, the internet or a pipeline repository (e.g., the pipeline repository 124). In some implementations, the first user interface 402 may also allow the user to select recently or frequently used pipelines. The first user interface 402 may provide a listing of pipelines stored on the pipeline repository 124 for the user to choose from, including different versions of a pipeline where pipelines are stored in a versioning system. The first user interface 402 may also provide a space for the user to store the imported pipeline within the virtual file system. In some implementations, the first user interface 402 may also include functionality for users to configure tokens to access restricted pipelines.

A second user interface 404 displays options for creating a data set. The data set may be input data (e.g., input data 102 and input data 106) for computational analysis. The second user interface 404 may present data available on locations available to a virtual file system. In some implementations, the second user interface 404 may present data spread across several cloud service accounts and local user storage locations. Accordingly, data can be easily located and combined for analysis. As shown in the second user interface 404, the user may store previous datasets for use in further analysis and may add new data to existing datasets. For example, as shown in the second user interface 404, the user may select additional run data to add to dataset B. The user may also create new datasets using the second user interface 404 from data accessible by the virtual file system. The second user interface 404 may also present options for the user to save a generated data set within the virtual file system.

A third user interface 406 presents information about the costs of using various combinations of compute resources (e.g., instances, machines, or virtual machine instances) for performing the computational analysis. Cost may be measured in, for example and without limitation, time, money, and computational resources. The third user interface 406 displays the monetary cost of running computational analysis with 1, 2, 4, 6, or 18 compute resources. In some implementations, the third user interface 406 also displays the time and computational resource costs of running computational analysis with various combinations of available compute resources. In other implementations, the user may be prompted to choose which costs to display before the third user interface 406 is generated. Where several secure clusters or compute nodes are generated for an analysis, the third user interface 406 may be presented separately for each secure cluster or compute node.

In some implementations, the third user interface 406 may display costs associated with different types of CPUs (e.g., CPUs with more or less memory). The costs displayed on the third user interface 406 may be calculated based on historical data about the analysis capabilities of the CPUs being offered for the computational analysis. The calculation of the costs on the third user interface 406 may also take into account special characteristics of the computational analysis such as the size of the dataset making up the input data and the complexity of the pipeline. Historical data about the analysis capabilities of the CPUs with similarly sized data sets and similar pipelines may make the costs presented in the third user interface 406 more accurate. Further, in some implementations, machine learning may be employed so that the estimations are more accurate over time. The user may interact with a slider in the third user interface 406 to select CPUs for use in the computational analysis.

A fourth user interface 408 displays the progress and results of the computational analysis. The fourth user interface 408 may be displayed shortly after the user initiates the computational analysis and may change to show progress until the computational analysis is completed. The fourth user interface 408 shown in FIG. 4 is shown when the computational analysis has been completed.

Generally, the computational analysis is performed within one or more secure clusters (e.g., the secure clusters 122, 126, and 132) created such that the input data is not copied or downloaded. Once analysis begins, a secure cluster cannot be accessed because the key to the cluster is destroyed. Accordingly, when the secure cluster is created, a monitor is placed within the secure cluster to stream runtime data about the analysis occurring within the secure cluster. The streamed runtime data may provide the status information displayed on the fourth user interface 408. In some implementations, the fourth user interface 408 may include separate information for each secure cluster or compute node used in the analysis.

Figure 5:
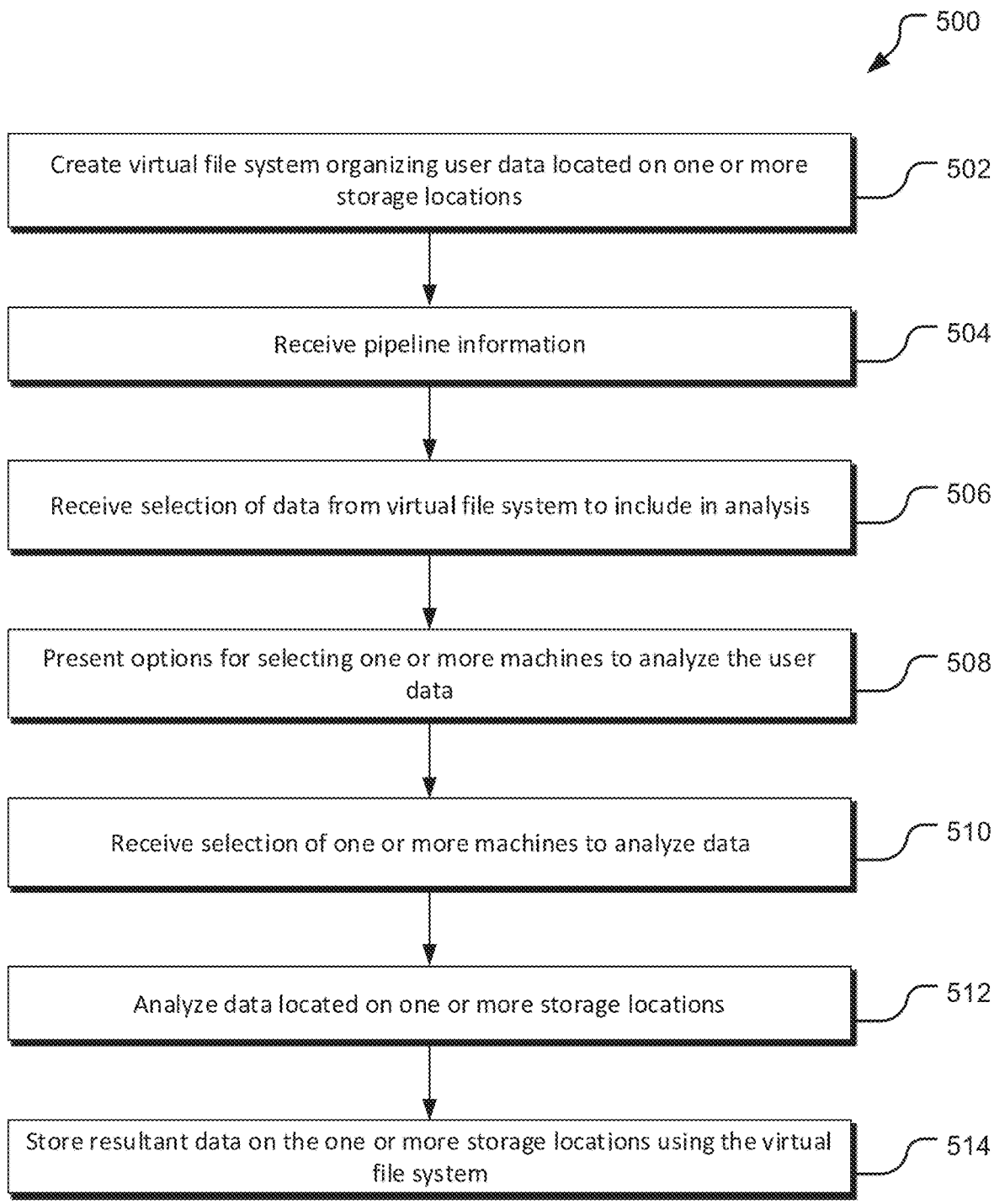
FIG. 5 is a flow diagram of steps for performing computational analysis.

FIG. 5 is a flow diagram of operation 500 for performing computational analysis with a computational analysis system. A creating operation 502 creates a virtual file system organizing user data located on one or more user storage locations. When user data is spread across more than one cloud services account, it may be difficult to locate and select data located within two different cloud services accounts for use in the same computational analysis. Accordingly, a virtual file system provides the user with a display of data available in selected cloud services accounts and in connected local user storage locations. Generally, the virtual file system may be generated without copying the data or changing where the data is physically stored. The virtual file system may be used to present a user interface to the user (e.g., the second user interface 404) to select data to be included in the computational analysis.

A first receiving operation 504 receives pipeline information for the pipeline to be used in the computational analysis. The user may choose a pipeline stored on a remote location. For example, the user may select a pipeline stored on the pipeline repository 124. In some implementations, pipeline information may also be stored on the one or more user remote locations. Further, in some implementations, the user may input a URL for a pipeline available on the internet. A second receiving operation 506 receives a selection of data from the virtual file system to include in the computational analysis.

A presenting operation 508 presents options for selecting one or more resources to analyze the user data. The presenting operation 508 may present different computational resources (e.g., machines with different amounts of memory and processing resources) or may present different groups of computational machines that are available for the computational analysis. The presented options may include costs, such as time, monetary, and computing resources, associated with different computational machines or groups of computational machines. Presented costs may be based on, for example, historical data about how the computational machines perform with similar pipelines and similar datasets or general statistical information about the computational machines. In some implementations, machine learning may be used to improve the accuracy of cost estimations over time.

A third receiving operation 510 receives a selection of one or more compute resources to analyze data. After being presented with cost information, the user may select one or more compute resources to perform the computational analysis. The user may be presented with an interface for selecting the compute resources to perform the computational analysis, such as the third user interface 406 in FIG. 4.

An analyzing operation 512 analyzes data located on one or more user storage locations. During the analyzing operation 512, the orchestrator of the analysis OS creates one or more secure clusters. The orchestrator passes a key to each secure cluster to initiate the cluster and configure the secure cluster for the computational analysis. The orchestrator also places a monitor within the secure cluster to pass run data to the orchestrator while the computational analysis is being performed. Once the monitors are placed within the secure clusters, the keys to the secure clusters are destroyed. Input data is streamed to the secure clusters as it is needed for analysis.

A storing operation 514 stores resultant data on one or more user storage locations using the virtual file system. Once the analysis is completed, the secure clusters may return resultant data to the orchestrator, which then stores the resultant data on one or more user storage locations. In some implementations, the user may be presented with an option to choose a location within the virtual file system to store the resultant data. Further, when the analysis is complete and the resultant data is stored, the secure clusters are destroyed.

Figure 6:
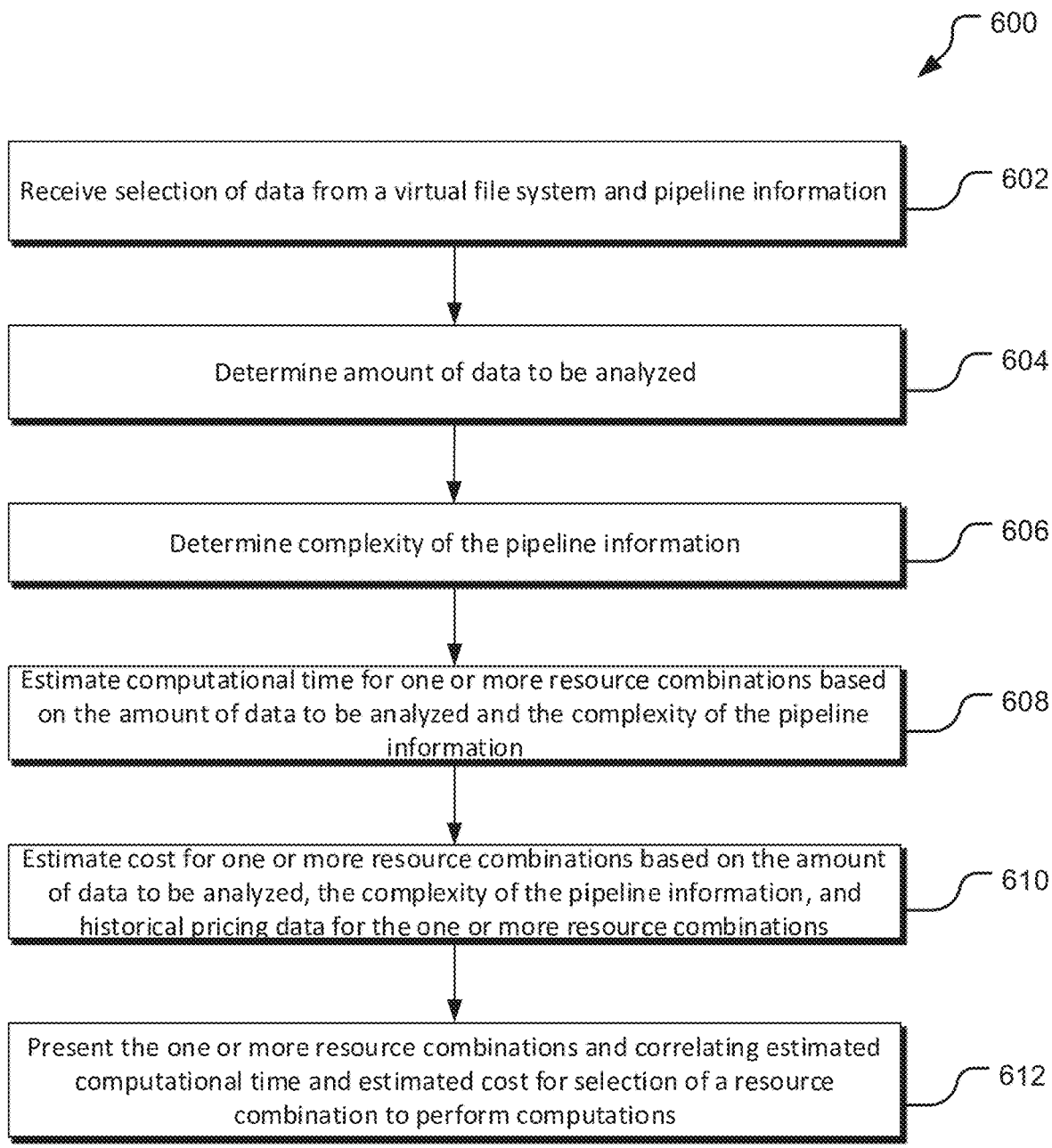
FIG. 6 is a flow diagram of steps for selecting one or more machines to perform computational analysis.

FIG. 6 is a flow diagram of operations 600 for selecting one or more compute resources to perform computational analysis. A receiving operation 602 receives a selection of data from a virtual file system and pipeline information. The virtual file system may be used to present a user interface to the user (e.g., the second user interface 404) to select data to be included in the computational analysis. The user may choose a pipeline stored on a remote location. For example, the user may select a pipeline stored on the pipeline repository 124. In some implementations, pipeline information may also be stored on the one or more user remote locations. Further, in some implementations, the user may input a URL for a pipeline available on the internet.

A first determining operation 604 determines the amount of data to be analyzed. A second determining operation 606 determines the complexity of the pipeline information. The complexity of the pipeline may be based on, for example, the number of steps or operations in the pipeline and the complexity of the steps or operations in the pipeline.

A first estimating operation 608 estimates computational time for one or more resource combinations based on the amount of data to be analyzed and the complexity of the pipeline information. The estimation of computational time may also be based on the stated capacity for the one or more resource combinations. The first estimating operation 608 may estimate computational time based on historical data of the one or more resource combinations. For example, information about actual run time of computational analysis by the one or more resource combinations using similar datasets and similar pipelines may be used in providing the estimation of computational time. In some implementations, machine learning may be used so that the estimate of computational time becomes more accurate over time.

A second estimating operation 610 estimates cost for one or more resource combinations based on the amount of data to be analyzed, the complexity of the pipeline information, and historical pricing data for the one or more resource combinations. Similar to the first estimating operation 608, the second estimating operation 610 may use actual cost of computational analysis for similar datasets and similar pipelines. Additionally, in some implementations, machine learning may be used so that the cost estimate becomes more accurate over time.

A presenting operation 612 presents the one or more resource combinations and correlating estimated cost for selection of a resource combination to perform computations. The one or more resource combinations may also be presented with correlating estimated computing time. The presenting operation 612 may present the information in a user interface displayed on a user computing device (e.g., the third user interface 406). In some implementations, the operations 600 may be repeated for additional secure clusters used to complete the analysis for the selected pipeline.

Figure 7:
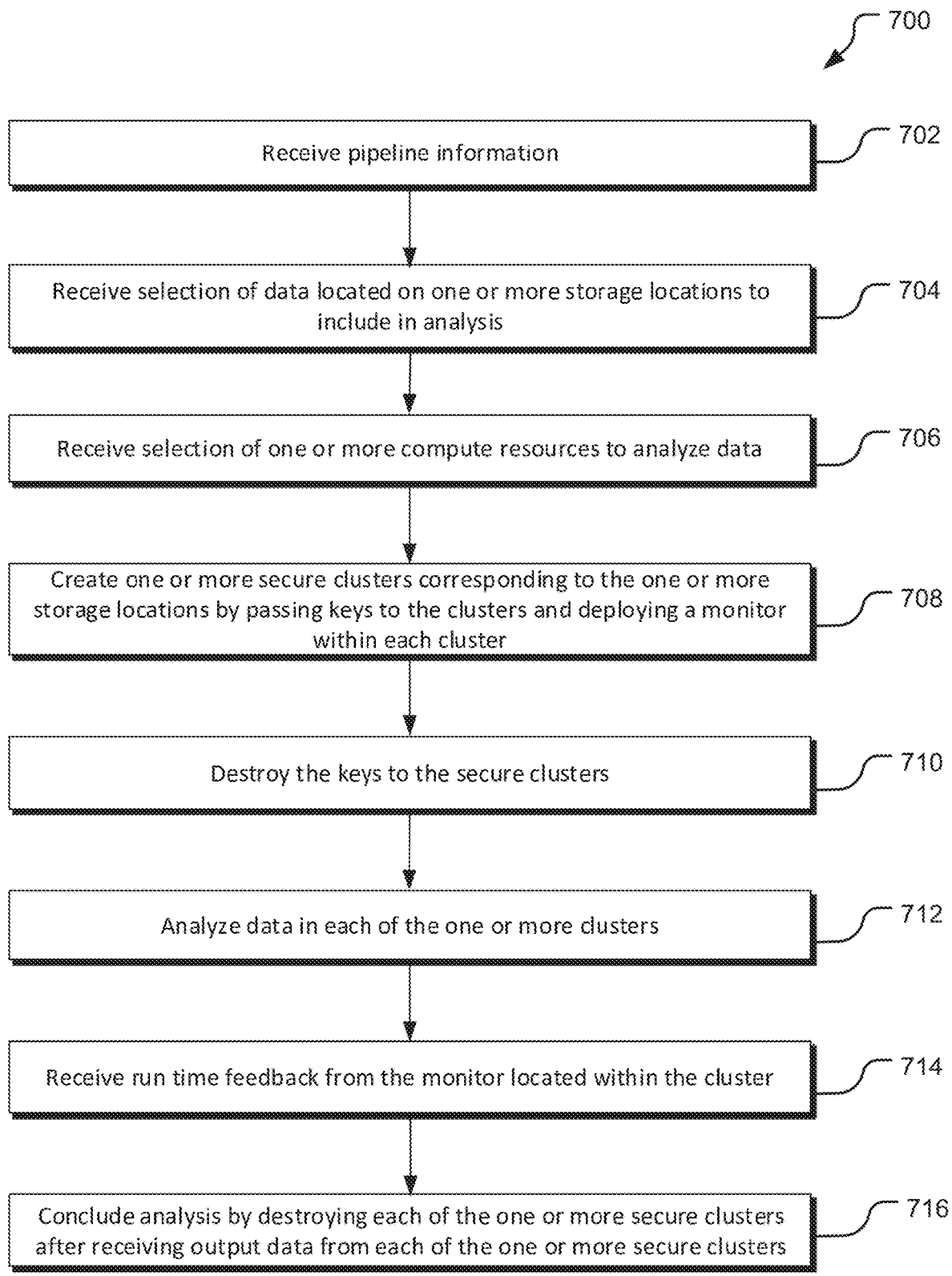
FIG. 7 is a flow diagram of steps for performing computational analysis in a secure cluster.

FIG. 7 is a flow diagram of operations 700 for performing computational analysis in a secure cluster. A first receiving operation 702 receives pipeline information. The user may choose a pipeline stored on a remote location. For example, the user may select a pipeline stored on the pipeline repository 124. In some implementations, pipeline information may also be stored on the one or more user remote locations. Further, in some implementations, the user may input a URL for a pipeline available on the internet or use a pipeline contained in the analysis OS.

A second receiving operation 704 receives a selection of data located on one or more user storage locations to include in data analysis. The user storage locations may include both remote user storage locations and local user storage locations. In some implementations, the data may be presented in a virtual file system. The virtual file system may be used to present a user interface to the user (e.g., the second user interface 404) to select data to be included in the computational analysis.

A third receiving operation 706 receives a selection of one or more compute resources to analyze data. The selection of one or more compute resources to analyze data may be received in response to presenting one or more compute resources available to perform the data analysis to the user. The one or more available compute resources may be presented with other information to help the user choose. For example and without limitation, the one or more available compute may be presented with estimated cost or estimated computational time for the selected data and pipeline information.

A creating operation 708 creates one or more secure clusters by passing a key to the cluster and deploying a monitor within the cluster for each of the created secure clusters. The secure cluster allows analysis of the data to occur within a secure structure such that the data, any intermediate data, and final data remain within a secure environment.

A destroying operation 710 destroys the keys to the secure clusters. Once the keys to the secure clusters are destroyed, the secure clusters can no longer be accessed. This provides additional security while sensitive data is being analyzed.

An analyzing operation 712 analyzes data in each of the one or more secure clusters. Generally, each of the secure clusters correspond to a storage location and data stored in a storage location is passed to the corresponding secure cluster for analysis. In other implementations, data from one storage location may be streamed to a secure cluster corresponding to another storage location that is part of the virtual file system.

A fourth receiving operation 714 receives run time feedback from the monitor located within the cluster. The run time feedback indicates where the analysis is and can provide statistics (such as current run time) for the analysis. In some implementations, the run time feedback may be displayed to the user while the analysis is ongoing. The run time feedback may also be used in deciding whether and when to destroy the secure cluster. For example, when the analysis is complete, the secure cluster may be destroyed. Additionally, if there is a problem with the analysis, the secure cluster may be destroyed before the analysis is complete. A concluding operation 716 concludes the analysis by destroying each of the one or more secure clusters after receiving output data from each of the one or more secure clusters.

Figure 8:
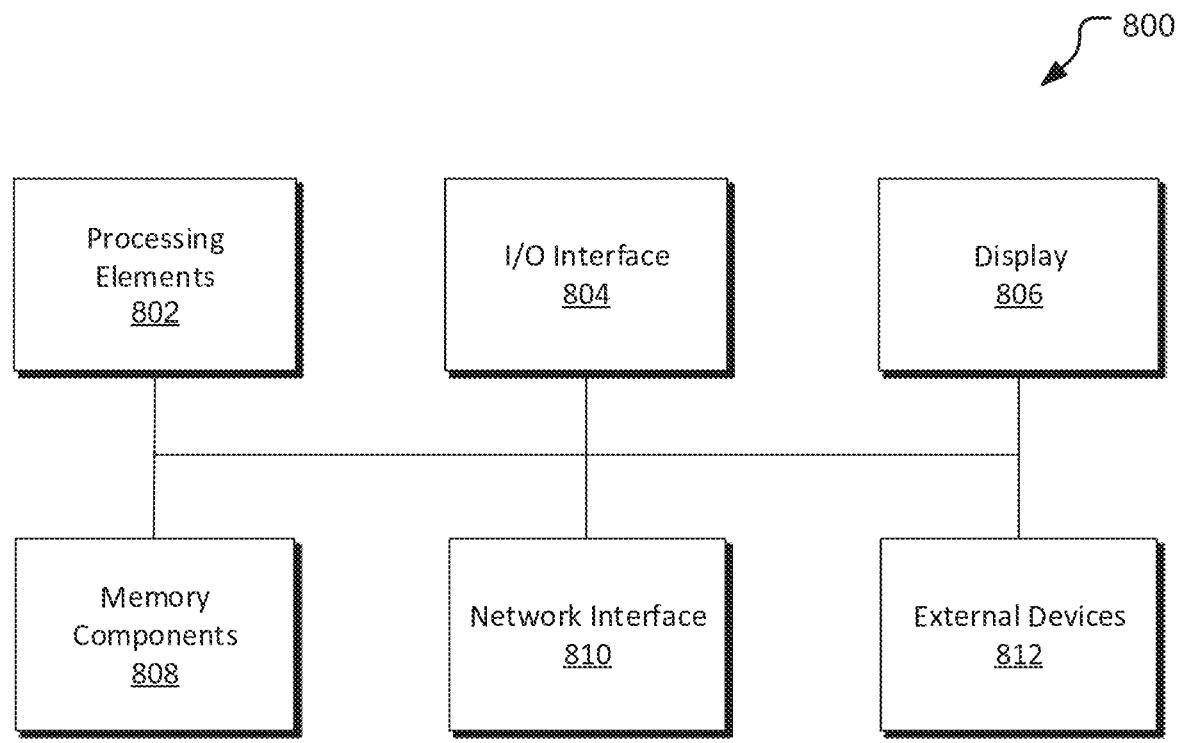
FIG. 8 is a schematic diagram of an example computer system for implementing various embodiments in the examples described herein.

FIG. 8 is a schematic diagram of an example computer system for implementing various embodiments in the examples described herein. A computer system 800 may be used to implement the user device 114 (in FIG. 1) or integrated into one or more components of the computational analysis system 100. For example, servers may include one or more of the components of the computer system 800 shown in FIG. 8. The computer system 800 is used to implement or execute one or more of the components or operations disclosed in FIGS. 1-7. In FIG. 8, the computer system 800 may include one or more processing elements 802, an input/output interface 804, a display 806, one or more memory components 808, a network interface 810, and one or more external devices 812. Each of the various components may be in communication with one another through one or more buses, communication networks, such as wired or wireless networks.

The processing element 802 may be any type of electronic device capable of processing, receiving, and/or transmitting instructions. For example, the processing element 802 may be a central processing unit, microprocessor, processor, or microcontroller. Additionally, it should be noted that some components of the computer 800 may be controlled by a first processor and other components may be controlled by a second processor, where the first and second processors may or may not be in communication with each other.

The memory components 808 are used by the computer 800 to store instructions for the processing element 802, as well as store data, such as the user pipeline repository (e.g., 124 in FIG. 1), and the like. The memory components 808 may be, for example, magneto-optical storage, read-only memory, random access memory, erasable programmable memory, flash memory, or a combination of one or more types of memory components.

The display 806 provides visual feedback to a user, such as a display of the user device 114 (FIG. 1). Optionally, the display 806 may act as an input element to enable a user to control, manipulate, and calibrate various components of the computational analysis system 100 (FIG. 1) as described in the present disclosure. The display 806 may be a liquid crystal display, plasma display, organic light-emitting diode display, and/or other suitable display. In embodiments where the display 806 is used as an input, the display may include one or more touch or input sensors, such as capacitive touch sensors, a resistive grid, or the like.

The I/O interface 804 allows a user to enter data into the computer 800, as well as provides an input/output for the computer 800 to communicate with other devices or services (e.g., user device 114 and/or other components in FIG. 1). The I/O interface 804 can include one or more input buttons, touch pads, and so on.

The network interface 810 provides communication to and from the computer 800 to other devices. For example, the network interface 810 may allow the analysis OS 116 (FIG. 1) to communicate with the user device 114 (FIG. 1) through a communication network. The network interface 810 includes one or more communication protocols, such as, but not limited to WiFi, Ethernet, Bluetooth, and so on. The network interface 810 may also include one or more hard-wired components, such as a Universal Serial Bus (USB) cable, or the like. The configuration of the network interface 810 depends on the types of communication desired and may be modified to communicate via WiFi, Bluetooth, and so on.

The external devices 812 are one or more devices that can be used to provide various inputs to the computing device 800, e.g., mouse, microphone, keyboard, trackpad, or the like. The external devices 812 may be local or remote and may vary as desired. In some examples, the external devices 812 may also include one or more additional sensors.

The foregoing description has a broad application. For example, while examples disclosed herein may focus on central communication system, it should be appreciated that the concepts disclosed herein may equally apply to other systems, such as a distributed, central or decentralized system, or a cloud system. For example, the user remote storage 104, the user remote storage 108, the analysis servers 116, and/or other components in the computational analysis system 100 (FIG. 1) may reside on a server in a client/server system, on a user mobile device, or on any device on the network and operate in a decentralized manner. One or more components of the computational analysis system 100 (FIG. 1) may also reside in a controller virtual machine (VM) or a hypervisor in a VM computing environment. Accordingly, the disclosure is meant only to provide examples of various systems and methods and is not intended to suggest that the scope of the disclosure, including the claims, is limited to these examples.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A method of performing computational data analysis comprising:
   importing a pipeline;
   selecting a dataset, the dataset residing on a virtual file system and including data residing on one or more storage locations associated with the virtual file system;
   selecting one or more compute resources to perform a pipeline analysis based at least on the imported pipeline and the dataset, the one or more compute resources being selected from a plurality of available compute resources associated with the one or more storage locations associated with the virtual file system;
   configuring one or more secure clusters within the virtual file system, the one or more secure clusters including the selected one or more compute resources;
   perform the pipeline analysis by streaming the data to the one or more secure clusters within the virtual file system; and
   submitting resulting data generated from the pipeline analysis to the virtual file system.

2. The method of claim 1, wherein performing the pipeline analysis includes streaming the dataset to the one or more secure clusters from one of the one or more storage locations.

3. The method of claim 1, wherein the virtual file system includes one or more files, the one or more files pointing to the data residing on the one or more storage locations.

4. The method of claim 1, further comprising:
   receiving a selection of a storage location of the one or more storage locations and a location within the virtual file system, wherein the resulting data generated from the pipeline analysis is submitted to the virtual file system in accordance with the selected storage location and the selected location within the virtual file system.

5. The method of claim 1, wherein the one or more storage locations are cloud storage locations.

6. The method of claim 1, wherein the one or more storage locations include cloud storage locations and localized user storage.

7. The method of claim 1, wherein the pipeline analysis is performed on the one or more selected compute resources wherein at least one of the one or more selected compute resources is part of a first secure cluster of the one or more secure clusters and at least a second of the one or more selected compute resources is part of a second secure cluster of the one or more secure clusters.

8. The method of claim 7, wherein the first secure cluster is correlated with a first storage location associated with the virtual file system and the second secure cluster is correlated with a second storage location associated with the virtual file system.

9. A system for performing computational data analysis comprising:
   one or more storage locations including input data, the input data on each of the one or more storage locations being accessible by a computing device using a virtual the system; and
   an analysis operating system executing on one or more processors of the computing device, the analysis operating system being configured to select one or more compute resources to perform analysis on the input data using a pipeline and to create one or more secure clusters within the virtual file system including the one or more compute resources, the one or more compute resources being configured to perform the analysis on the input data using the pipeline by streaming the input data to the one or more secure clusters, wherein the one or more secure clusters are not accessible after creation, wherein resulting data generated from the analysis is submitted to the virtual file system.

10. The system of claim 9, wherein the input data is located on two or more storage locations.

11. The system of claim 10, wherein the input data is represented by a dataset located on a virtual file system.

12. The system of claim 9, wherein at least one of the one or more storage locations is a localized user storage location associated with localized user compute resources and wherein the analysis operating system is further configured to create a secure cluster including one or more of the localized user compute resources.

13. The system of claim 9, wherein the analysis operating system is further configured to store results from the analysis of the input data using the pipeline to a location on the virtual file system.

14. A method of performing computational data analysis comprising:
   importing a pipeline;
   presenting one or more combinations of one or more compute resources to perform a pipeline analysis based on the pipeline, wherein the one or more compute resources are associated with one or more of a plurality of storage locations communicatively connected using a virtual file system, and wherein the pipeline analysis uses input data located on the plurality of storage locations;
   selecting one or more compute resources to perform the pipeline analysis based at least on a user input;
   perform the pipeline analysis using the one or more selected compute resources, the one or more compute resources being located within one or more secure clusters on the one or more storage locations; and
   submitting resulting data generated from the pipeline analysis to one or more selected storage locations of the plurality of storage locations communicatively connected by the virtual file system.

15. The method of claim 14, wherein presenting the one or more combinations of one or more compute resources includes presenting an estimated run time of the pipeline analysis for each of the one or more combinations of one or more compute resources.

16. The method of claim 15, wherein machine learning is used to improve the estimated run time over time.

17. The method of claim 14, wherein presenting the one or more combinations of one or more compute resources includes presenting an estimated cost of the pipeline analysis for each of the one or more combinations of one or more compute resources.

18. The method of claim 17, wherein the estimated cost of the pipeline analysis is based on historical pricing data for the one or more compute resources.

19. The method of claim 14, further comprising:
   creating one of the one or more secure clusters on a cloud compute resource, the secure cluster including a monitor configured to return run time data during the analysis.

20. The method of claim 19, further comprising:
   destroying one or more keys to the secure cluster prior to the analysis.

* * * * *

(12) EX PARTE REEXAMINATION CERTIFICATE (12504th)
United States Patent
Barja et al.

(10) Number: US 10,769,167 C1
(45) Certificate Issued: Feb. 1, 2024

(54) FEDERATED COMPUTATIONAL ANALYSIS OVER DISTRIBUTED DATA

(71) Applicant: LIFEBIT BIOTECH LIMITED, London (GB)

(72) Inventors: Pablo Prieto Barja, London (GB); Maria Chatzou, London (GB); Matija Sosic, London (GB); Martin Sosic, London (GB); Diogo Nuno Proenca Silva, London (GB); Bruno Filipe Ribeiro Goncalves, London (GB); Tiago Filipe Salgueiro De Jesus, London (GB); Olga Kruglova, London (GB); Damyan Dobrev, London (GB)

(73) Assignee: LIFEBIT BIOTECH LIMITED, London (GB)

Reexamination Request:
No. 90/015,209, Mar. 9, 2023

Reexamination Certificate for:
Patent No.: 10,769,167
Issued: Sep. 8, 2020
Appl. No.: 16/777,637
Filed: Jan. 30, 2020

(51) Int. Cl.
| | |
|---|---|
| *G06F 16/25* | (2019.01) |
| *G06F 16/28* | (2019.01) |
| *G06N 20/00* | (2019.01) |
| *G06F 21/62* | (2013.01) |
| *H04L 9/08* | (2006.01) |
| *G06F 16/2458* | (2019.01) |
| *G06F 16/16* | (2019.01) |
| *G06F 16/22* | (2019.01) |
| *G06F 16/14* | (2019.01) |

(52) U.S. Cl.
CPC .......... *G06F 16/256* (2019.01); *G06F 16/285* (2019.01); *G06F 21/6218* (2013.01); *G06N 20/00* (2019.01); *H04L 9/0891* (2013.01); *G06F 16/148* (2019.01); *G06F 16/164* (2019.01); *G06F 16/2255* (2019.01); *G06F 16/2471* (2019.01)

(58) Field of Classification Search
None
See application file for complete search history.

(56) References Cited

To view the complete listing of prior art documents cited during the proceeding for Reexamination Control Number 90/015,209, please refer to the USPTO's Patent Electronic System.

*Primary Examiner* — Peng Ke

(57) ABSTRACT

The present disclosure provides for computational data analysis across multiple data sources. A pipeline (or workflow) is imported and a dataset is selected. The dataset resides on a virtual file system and includes data residing on one or more storage locations associated with the virtual file system. One or more compute resources are selected to perform the pipeline analysis based at least on the imported pipeline and the dataset. The one or more compute resources are selected from a plurality of available compute resources associated with the one or more storage locations associated with the virtual file system. The pipeline analysis is performed using the selected compute resources on the dataset in one or more secure clusters. The resulting data generated from the pipeline analysis is submitted to the virtual file system.

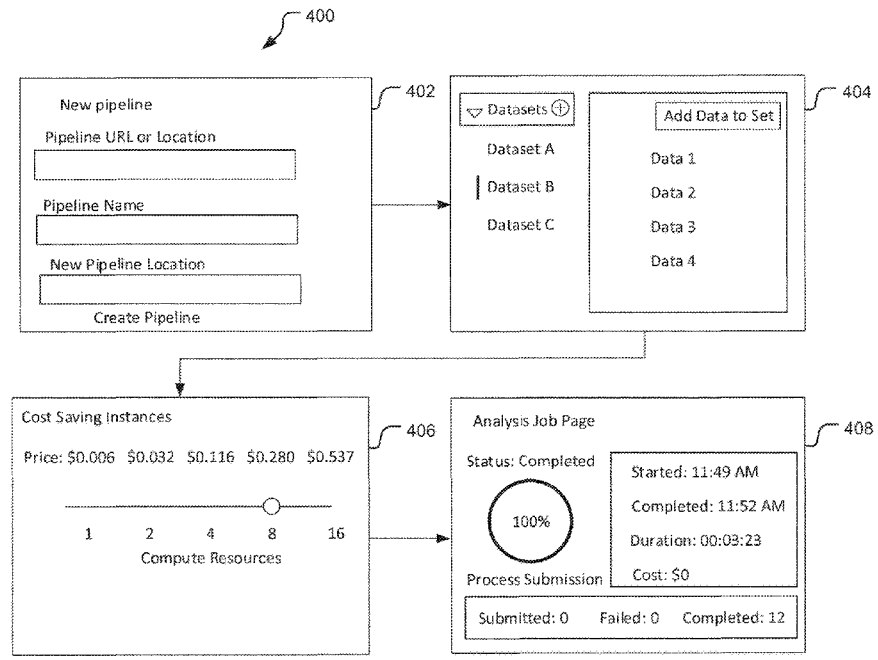

US 10,769,167 C1

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-8 is confirmed.

Claims 9 and 13-14 are determined to be patentable as amended.

Claims 10-12 and 15-20, dependent on an amended claim, are determined to be patentable.

New claims 21-49 are added and determined to be patentable.

9. A system for performing computational data analysis comprising:

one or more storage locations including input data, the input data on each of the one or more storage locations being accessible by a computing device using a virtual file system; and an analysis operating system executing on one or more processors of the computing device, the analysis operating system being configured to *select a dataset from the input data by presenting a user interface with the input data across the storage locations as if the data were in a single location and receive a user input selecting the dataset, the analysis operating system being further configured to* select one or more compute resources to perform analysis on the *data set of the* input data using a pipeline and to create one or more secure clusters within the virtual file system including the one or more compute resources, the one or more compute resources being configured to perform the analysis on the *data set of the* input data using the pipeline by streaming *data of* the *data set of the* input data to the one or more secure clusters, wherein the one or more secure clusters are not accessible after creation, wherein resulting data generated from the analysis is submitted to the virtual file system.

13. The system of claim 9, wherein the analysis operating system is further configured to store results from the analysis of the *dataset of the* input data using the pipeline to a location on the virtual file system.

14. A method of performing computational data analysis comprising:

importing a pipeline;

*selecting a dataset, the dataset residing on a virtual file system and including data residing on one or more of a plurality of storage locations associated with the virtual file system, wherein selecting the dataset comprises presenting, via a user interface, the data across the plurality storage locations associated with the virtual file system as if the data were in a single location and receiving user input selecting the dataset;* presenting one or more combinations of one or more compute resources to perform a pipeline analysis based on the pipeline, wherein the one or more compute resources are associated with one or more of [a] *the* plurality of storage locations communicatively connected using [a] *the* virtual file system, and wherein the pipeline analysis uses input data located on the plurality of storage locations;

selecting one or more compute resources to perform the pipeline analysis based at least on a user input;

perform the pipeline analysis *for the selected dataset* using the one or more selected compute resources, the one or more compute resources being located within one or more secure clusters on the one or more storage locations; and submitting resulting data generated from the pipeline analysis to one or more selected storage locations of the plurality of storage locations communicatively connected by the virtual file system.

*21. A method of performing computational data analysis comprising:*

*importing a pipeline;*

*selecting a dataset, the dataset residing on a virtual file system and including data residing on one or more storage locations associated with the virtual file system, wherein selecting the dataset comprises presenting, via a user interface, the data across the storage locations associated with the virtual file system as if the data were in a single location and receiving user input selecting the dataset;*

*selecting one or more compute resources to perform a pipeline analysis based at least on the imported pipeline and the dataset, the one or more compute resources being selected from a plurality of available compute resources associated with the one or more storage locations associated with the virtual file system;*

*configuring one or more secure clusters within the virtual file system, the one or more secure clusters including the selected one or more compute resources;*

*perform the pipeline analysis by streaming data from the dataset to the one or more secure clusters within the virtual file system; and*

*submitting resulting data generated from the pipeline analysis to the virtual file system.*

*22. The method of claim 21, further comprising determining that there is a problem with the pipeline analysis and destroying the one or more secure clusters before the pipeline analysis is complete.*

*23. The method of claim 21, further comprising preventing access to the data within the secure cluster by destroying one or more keys that provide access to the one or more secure cluster, wherein the keys are destroyed prior to the pipeline analysis.*

*24. The method of claim 21, further comprising receiving a second user selection input to a computing device of a configuration of tokens to access restricted pipelines.*

*25. The method of claim 21, wherein the user input includes an indication to add new data to a previous dataset.*

*26. The method of claim 21, further comprising presenting options for a user to save the dataset within the virtual file system.*

*27. A method of performing computational data analysis comprising:*

*importing a pipeline;*

*selecting a dataset, the dataset residing on a virtual file system and including data residing on one or more storage locations associated with the virtual file system;*

*selecting one or more compute resources to perform a pipeline analysis based at least on the imported pipeline and the dataset, the one or more compute resources being selected from a plurality of available compute* resources associated with the one or more storage locations associated with the virtual file system;

configuring one or more secure clusters within the virtual file system by associating the one or more secure clusters with at least respective keys used to access the one or more secure clusters, the one or more secure clusters including the selected one or more compute resources;

destroying the respective keys associated with the one or more secure clusters prior to the pipeline analysis;

perform the pipeline analysis by streaming data from the dataset to the one or more secure clusters within the virtual file system; and submitting resulting data generated from the pipeline analysis to the virtual file system.

28. The method of claim 27, further comprising determining that there is a problem with the pipeline analysis and destroying the one or more secure clusters before the pipeline analysis is complete.

29. The method of claim 27, wherein selecting the dataset comprises presenting, via a single user interface, the data across the storage locations associated with the virtual file system and receiving user input indicating the dataset.

30. The method of claim 27, further comprising preventing access to the data within the secure cluster by destroying one or more keys that provide access to the one or more secure cluster, wherein the keys are destroyed prior to the pipeline analysis.

31. The method of claim 27, further comprising receiving a user selection input to a computing device of a configuration of tokens to access restricted pipelines.

32. The method of claim 27, wherein the user selection input includes an indication to add new data to a previous dataset.

33. The method of claim 27, further comprising presenting options for a user to save the dataset within the virtual file system.

34. A method of performing computational data analysis comprising:

receiving a pipeline selection from a user via a first user interface;

receiving a user selection via a second user interface for a computing device of a dataset, the dataset residing on a virtual file system and including data residing on two or more storage locations associated with the virtual file system;

selecting one or more compute resources to perform a pipeline analysis based at least on the imported pipeline and the dataset, the one or more compute resources being selected from a plurality of available compute resources associated with the two or more storage locations associated with the virtual file system;

configuring one or more secure clusters within the virtual file system, the one or more secure clusters including the selected one or more compute resources;

perform the pipeline analysis by streaming data from the dataset to the one or more secure clusters within the virtual file system; and submitting resulting data generated from the pipeline analysis to the virtual file system.

35. The method of claim 34, further comprising determining that there is a problem with the pipeline analysis and destroying the one or more secure clusters before the pipeline analysis is complete.

36. The method of claim 34, wherein selecting the dataset comprises presenting, via the second user interface, the data across the storage locations associated with the virtual file system and receiving a user input, wherein the dataset is presented as a single virtual location on the second user interface.

37. The method of claim 34, further comprising preventing access to the data within the secure cluster by destroying one or more keys that provide access to the one or more secure cluster, wherein the keys are destroyed prior to the pipeline analysis.

38. The method of claim 34, further comprising receiving a user selection input to a computing device of a configuration of tokens to access restricted pipelines.

39. The method of claim 34, wherein the user selection input includes an indication to add new data to a previous dataset.

40. The method of claim 34, further comprising presenting options for a user to save the dataset within the virtual file system.

41. The method of claim 1, further comprising presenting an estimated run time of the pipeline analysis for one or more combinations of the one or more compute resources, wherein machine learning is used to improve an estimated run time over time.

42. The method of claim 1, further comprising destroying the one or more secure clusters before the pipeline analysis is complete when there is a problem with the pipeline analysis, or when the pipeline analysis is complete.

43. The method of claim 1, further comprising creating the one or more secure clusters on a cloud compute resource, the one or more secure clusters including a monitor configured to return run time data during the pipeline analysis.

44. The method of claim 1, further comprising destroying one or more keys to the one or more secure cluster prior to the pipeline analysis.

45. The method of claim 1, wherein the one or more secure clusters are encrypted and protected by a key.

46. The method of claim 1, wherein the one or more secure clusters are inaccessible after creation.

47. A method for performing computational analysis comprising:

generating a virtual file system organizing data located on two or more storage locations across a network;

presenting on a first user interface a display of the organized data in the virtual file system as residing in a single location;

receiving a workflow for data analysis via a first user input;

receiving a data selection from a second user input, wherein the second user input is received via the first user interface;

presenting on a second user interface two or more options for compute resources to perform the workflow for the data selection;

receiving a selection of one or more compute resources via the second user interface;

configuring at least one secure cluster for analyzing the data selection based on the workflow, the at least one secure cluster including the selected one or more compute resources;

performing the workflow analysis by streaming the data from the two or more storage locations to the at least one secure cluster within the virtual file system, wherein the data is not accessible within the at least one secure cluster; and outputting a resultant data to a storage location using the virtual file system.

48. The method of claim 47, wherein the two or more storage locations include network cloud storage locations that are hosted by different cloud storage providers.

49. The method of claim 47, further comprising destroying the at least one secure cluster once the resultant data is output to the storage location.

\* \* \* \* \*